United States Patent [19]

Phillips

[11] Patent Number: 5,617,543

[45] Date of Patent: Apr. 1, 1997

[54] NON-ARITHMETICAL CIRCULAR BUFFER CELL AVAILABILITY STATUS INDICATOR CIRCUIT

[75] Inventor: Christopher E. Phillips, San Jose, Calif.

[73] Assignee: National Semiconductor Corporation, Santa Clara, Calif.

[21] Appl. No.: 451,535

[22] Filed: May 26, 1995

[51] Int. Cl.$^6$ .................................................. G06F 12/00
[52] U.S. Cl. ........................................................... 395/250
[58] Field of Search ...................... 364/DIG. 1 MS File, 364/DIG. 2 MS File; 395/250

[56] References Cited

U.S. PATENT DOCUMENTS

| | | | |
|---|---|---|---|
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |

FOREIGN PATENT DOCUMENTS 0533337  3/1993  European Pat. Off. .

OTHER PUBLICATIONS

Serra, Micaela & Dervisoglu, Bulent I, "Testing",Chapter 79, *The Electrical Engineering Handbook*, Richard C. Dorf, Editor-in-Chief, pp. 1808–1837, CRC Press.

L-T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80x86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

(List continued on next page.)

*Primary Examiner*—Robert B. Harrell
*Attorney, Agent, or Firm*—Limbach & Limbach L.L.P.

[57] ABSTRACT

An availability status indicator circuit simultaneously indicates which of N circular buffer cells ($CBC_x$, for $x=0$ through $N-1$) are available for access. N cell status circuits are provided that correspond to the separate circular buffer cells. Each cell status circuit includes an output terminal at which a cell availability status signal is provided to indicate the availability status of the corresponding circular buffer cell. A first input terminal of the cell status circuit is connected to receive the cell availability status signal from the previous cell status circuit. The cell availability status signal is generated in response to the cell availability status signal of the previous cell, to a available address indicator signal that includes an indicator of whether the corresponding circular buffer cell is a first circular buffer cell available to be accessed, and to an unavailable address indicator signal that includes an indicator of whether the corresponding circular buffer cell is a last circular buffer cell available to be accessed. The cell availability status signal has a first state if the corresponding circular buffer cell is available for access and has a second state if the corresponding circular buffer cell is not available for access.

5 Claims, 4 Drawing Sheets

OTHER PUBLICATIONS

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

Holdsworth B.: "Digital Logic Design" 1993, Butterworth-Heinemann, Oxford, section 10.3 pp. 222–231.

NON-ARITHMETICAL CIRCULAR BUFFER CELL AVAILABILITY STATUS INDICATOR CIRCUIT

TECHNICAL FIELD OF THE INVENTION

The present invention relates to status indicator circuits for use with circut buffer and, in particular, to a status indicator circuit that indicates which cells of a circular buffer are available for access, without the need for complicated arithmetic logic.

BACKGROUND OF THE INVENTION

Figure 1:
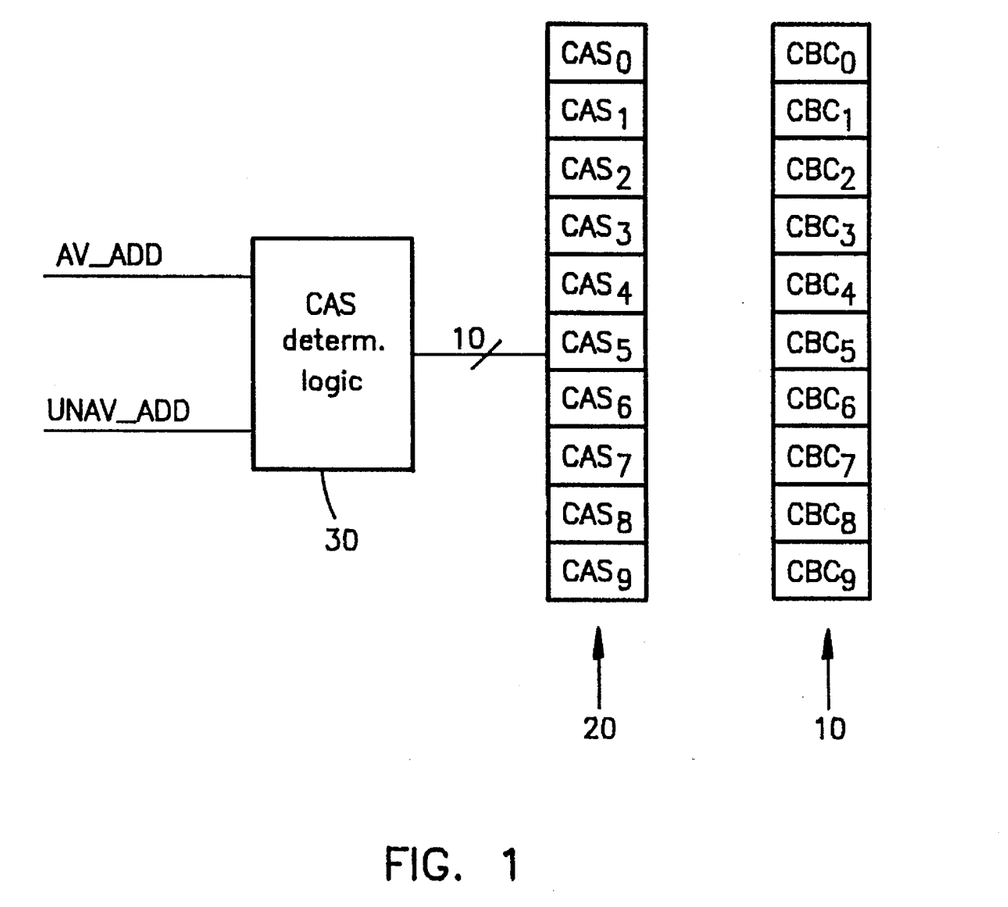
FIG. 1 schematically illustrates a circular buffer circuit and an associated cell availability status circuit, with cell availability status determination logic for setting the cell availability status circuit.

Circular buffers are well known in the art. An example of a ten-cell circular buffer 10 (i.e., an N-cell circular buffer, where N is equal to 10) is shown in FIG. 1. Circular buffer 10 has ten circular buffer cells ($CBC_x$, for x=0 through 9). Circular buffers such as circular buffer 10 are typically accessed sequentially. For example, $CBC_9$ is accessed after $CBC_8$. After the last circular buffer cell is accessed, a "wrap-around" occurs such that the next circular buffer cell to be accessed is the first circular buffer cell. That is, referring to circular buffer 10, $CBC_0$ is accessed after $CBC_9$ is accessed. Thus, for a circular buffer cell of arbitrary length N, each circular buffer cell, $CBC_x$ is accessed after $CBC_{((x-1)+N) \, REM \, N}$, where "REM" is a function that yields, in a division operation, the number that is the undivided part of the dividend (i.e., the remainder).

Circular buffers are of particular utility in data communications devices. For example, in a data receiver, received data would typically be inserted sequentially into a circular buffer. Once data is inserted into a particular cell of the circular buffer, this cell becomes unavailable for access until the received data is processed. At that point, this cell again becomes available for access.

The circular buffer 10, of FIG. 1, has a ten-cell availability status circuit 20, associated with it. Each status cell of ten-cell availability status circuit 20 ($CAS_x$, for x=0 through 9) corresponds to one of the circular buffer cells ($CBC_x$, for x=0 through 9, respectively). The state of a particular status cell, $CAS_x$, of the availability status circuit 20 indicates whether the corresponding circular buffer cell, $CBC_x$, is available for access.

As shown in FIG. 1, the states of the status cells, $CAS_x$, of the cell availability status circuit 20 are determined by CAS determination logic 30. The CAS determination logic 30 responds to an available address indicator signal, AV_ADD, that indicates which of the circular buffer cells is the first circular buffer cell available for access; and to an unavailable address indicator signal, UNAV_ADD, that indicates which of the circular buffer cells is the first circular buffer cell unavailable for access. For example, if AV_ADD indicates that $CBC_2$ is the first circular buffer cell available for access, and if UNAV_ADD indicates that $CBC_5$ is the first circular buffer cell unavailable for access, then CAS determination logic 30 sets cell availability status circuits $CAS_2$, $CAS_3$, and $CAS_4$ to indicate that corresponding circular buffer cells $CBC_2$, $CBC_3$, and $CBC_4$ are available for access. Likewise, CAS determination logic 30 sets cell availability status circuits $CAS_0$, $CAS_1$, $CAS_5$, $CAS_6$, $CAS_7$, $CAS_8$, and $CAS_9$ to indicate that corresponding circular buffer cells $CBC_0$, $CBC_1$, $CBC_5$, $CBC_6$, $CBC_7$, $CBC_8$, and $CBC_9$ are not available for access.

Conventional CAS determination logic circuits employ arithmetic circuitry to determine how to set the availability status circuits. However, such arithmetic circuitry is complicated. In particular, since circular buffers "wrap-around", the arithmetic circuitry of conventional CAS determination logic circuits must perform complicated modular arithmetic.

Therefore, what is desired is an availability status indicator circuit with CAS determination logic circuitry that can determine, without complex arithmetic circuitry or high-overhead masking logic, how to set availability status circuits.

SUMMARY OF THE INVENTION

The present invention is an availability status indicator circuit for simultaneously indicating which of N circular buffer cells ($CBC_x$, for x=0 through N–1) are available for access.

N cell status circuits are provided that correspond to the separate circular buffer cells. Each cell status circuit includes an output terminal at which a cell availability status signal is provided to indicate the availability status of the corresponding circular buffer cell. A first input terminal of the cell status circuit is connected to receive the cell availability status signal from the previous cell status circuit.

The cell availability status signal is generated in response to the cell availability status signal of the previous cell, to an available address indicator signal that indicates whether the corresponding circular buffer cell is a first circular buffer cell available to be accessed, and to an unavailable address indicator signal that indicates whether the corresponding circular buffer cell is a last circular buffer cell available to be accessed. The cell availability status signal has a first state if the corresponding circular buffer cell is available for access and has a second state if the corresponding circular buffer cell is not available for access.

A better understanding of the features and advantages of the invention will be obtained by reference to the following detailed description and accompanying drawings which set forth an illustrative embodiment in which the principles of the invention are utilized.

DETAILED DESCRIPTION

Figure 2:
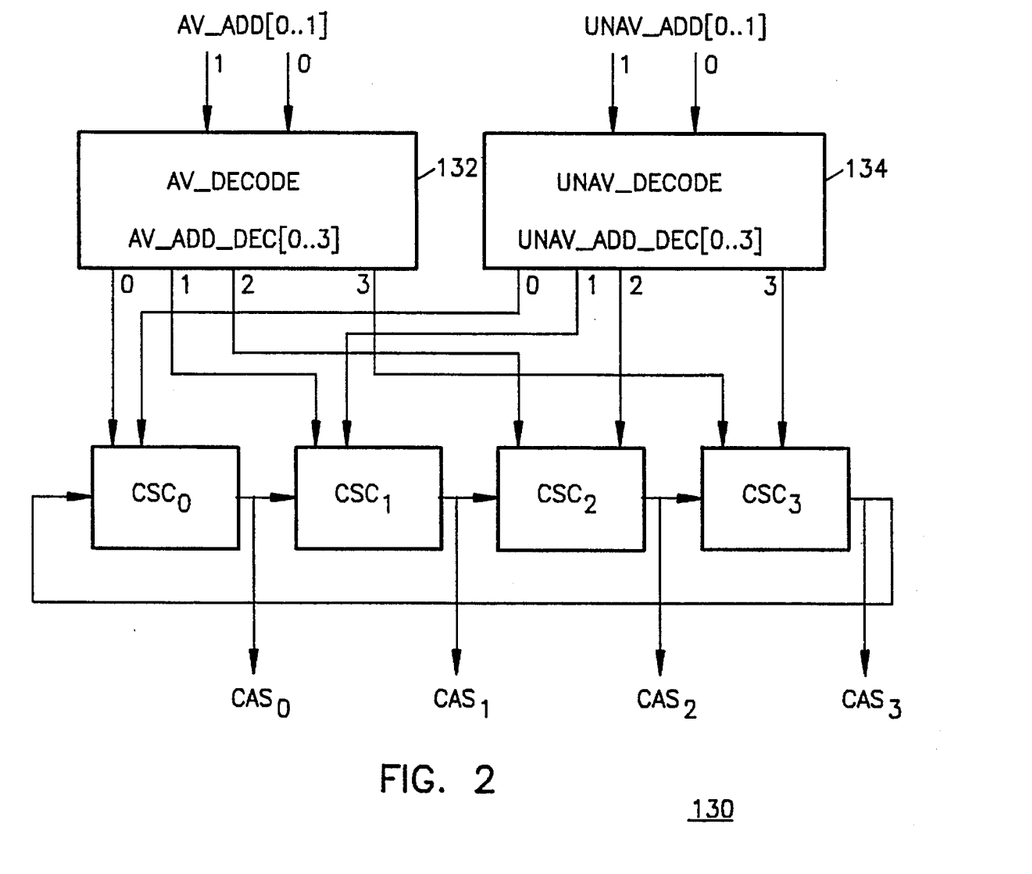
FIG. 2 is a block diagram showing a cell determination logic circuit in accordance with the present invention.

FIG. 2 is a block diagram showing a cell determination logic circuit 130 in accordance with the present invention. For simplicity of illustration, the cell determination logic circuit 130 shown in FIG. 2 indicates the availability of the cells of a four cell circular buffer (i.e., N equals 4).

Reffering to FIG. 2, a first decoder (AV_DECODE) 132 receives a two bit start address signal (AV_ADD [0.1] that indicates which of the N corresponding circular buffer cells is the first circular buffer cell available for access. For example, if circular buffer cell 1 is the first circular buffer cell available for access, then AV_ADD has the value of 01 h. First decoder (AV_DECODE) 132 operates in a conventional manner. That is, first decoder (AV_DECODE) 132 asserts one of its output bits, AV_ADD_DEC [0.3], in response to the available address signal, AV_ADD. The separate output bits of the first decoder (AV_DECODE) 132 output, AV_ADD_DEC, are provided to separate corresponding cell status circuits, $CSC_x$ (for x=0 through 3, respectfully).

It is the cell status circuits, $CSC_x$ which generate the cell availability status signals, $CAS_x$. Each cell status circuit, $CSC_x$ provides the corresponding cell availability status signal, $CAS_x$, at its output.

Similar to the first decoder (AV_DECODE) 132 a second decoder (UNAV_DECODE) 134 receives a two bit end address signal (UNAV_ADD [0..1]) that indicates which of the N corresponding circular buffer cells is the first circular buffer cell unavailable for access. For example, if circular buffer cell 3 is the first circular buffer cell unavailable for access, then UNAV_ADD has the value of 03h. Second decoder (UNAV_DECODE) 134 operates in a conventional manner. That is, second decoder (UNAV_DECODE) 134 asserts one of its outputs, $UNAV\_ADD\_DEC_x$, in response to the unavailable address signal, UNAV_ADD. The separate bits of the second decoder (UNAV_DECODE) 134 output, UNAV_ADD_DEC, are provided to the separate corresponding cell status circuits, $CSC_x$.

Figure 3:
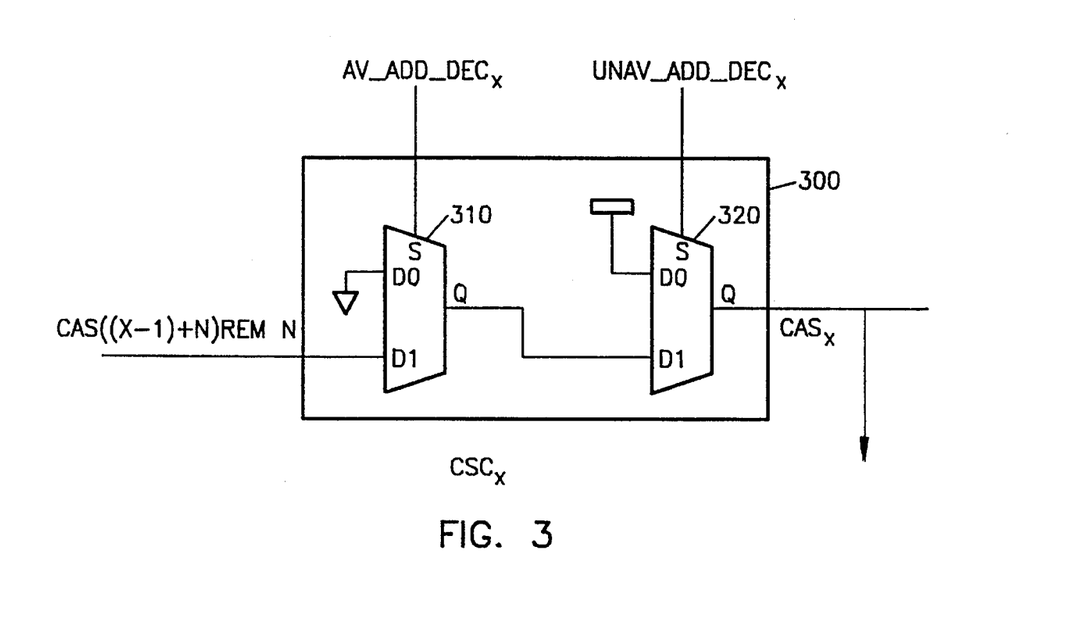
FIG. 3 schematically illustrates a first embodiment, in accordance with the present invention, of a cell status circuit of the cell determination logic circuit of FIG. 2.
Figure 4:
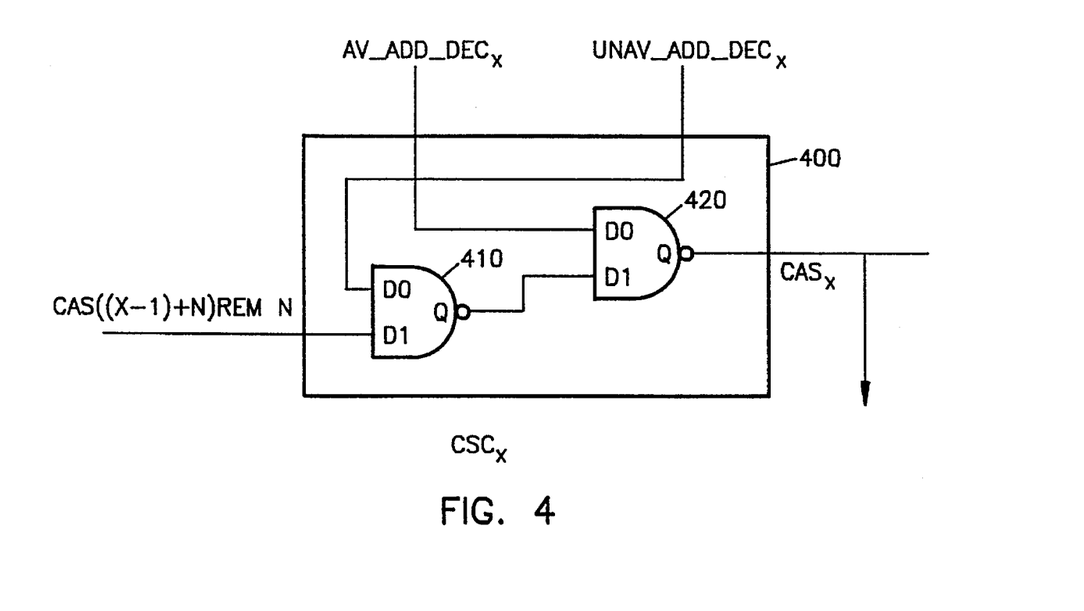
FIG. 4 schematically illustrates a second embodiment, in accordance with the present invention, of a cell status circuit of the cell determination logic circuit of FIG. 2.
Figure 5:
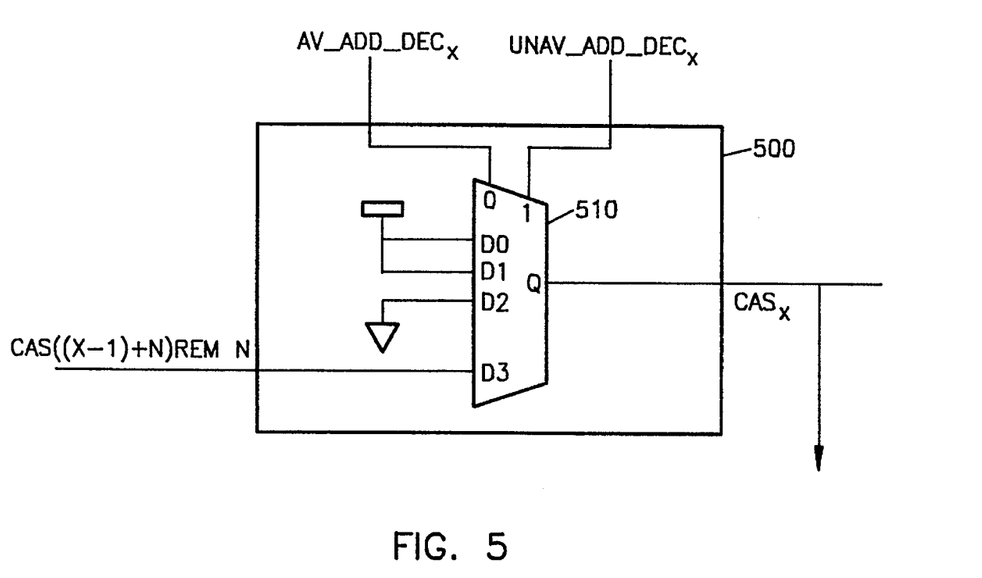
FIG. 5 schematically illustrates a third embodiment, in accordance with the present invention, of a cell status circuit of the cell determination logic circuit of FIG. 2.

As is discussed below with reference to the several described embodiments of the invention (FIGS. 3–5), it is an important feature of the present invention that each cell status circuit, $CSC_x$, is additionally connected to receive the cell availability status signal generated by the "previous" cell status circuit. "Previous" is meant in the "circular" sense. That is, each cell status circuit, $CSC_x$, is connected to receive $CAS_{((x-1)+N) REM N}$. Furthermore, each cell status circuit, $CSC_x$, is configured such that the cell availability status signal, $CAS_x$, that it provides to its output, is identical to the cell availability status signal, $CAS_{((x-1)+N) REM N}$, provided by the "previous" cell availability status circuit, $CSC_{((x-1)+N) REM N}$, unless:

(1) $AV\_ADD\_DEC_x$ does not indicate that $CBC_x$ is the first circular buffer cell available for access; and (2) $UNAV\_ADD\_DEC_x$ does not indicate that the $CBC_x$ is the first circular buffer cell unavailable for access.

Otherwise, if $AV\_ADD\_DEC_x$ does indicate that $CBC_x$ is the first circular buffer cell available for access in which case the cell availability status signal, $CAS_x$, provided by the cell status circuit, $CSC_x$, has a first state, to indicate that $CBC_x$ is available for access. Finally, if $UNAV\_ADD\_DEC_x$ does indicate that the $CBC_x$ is the last circular buffer cell available for access, the cell availability status signal, $CAS_x$, provided by the cell status circuit, $CSC_x$, has a second state to indicate that $CBC_x$ is unavailable for access.

FIGS. 3–5 illustrates different embodiments (300, 400, and 500, respectively) of a cell status circuit, $CSC_x$, of the cell determination logic circuit 130. Throughout the foregoing description, it is assumed that the cell availability status signal indicates availability with a "high" level and indicates nonavailability with a "low" level. Also, it is assumed that the decoded available and unavailable address indicators, $AV\_ADD\_DEC_x$ and $UNAV\_ADD\_DEC_x$, respectively, are active low. However, based on the teaching provided herein, it would be well within the ability of one skilled in the art to implement the invention utilizing reverse polarity from that described above.

Referring now to FIG. 3, a first two-to-one data selector 310 has its first data input "D0" connected to receive a constant signal having a level at ground, and its second data input "D1" connected to receive the cell availability signal, $CAS_{((x-1)+N) REM N}$, generated by the "previous" cell availability status circuit, $CSC_{((-1)+N) REM N}$. One of the signals provided to first data input "D0" and second data input "D1" of the first data selector 310 is selected to be provided to the output "Q" of data selector 310 under the control of $AV\_ADD\_DEC_x$, provided to the select input "S" of data selector 310.

A second two-to-one data selector 320 has its first input "D0" connected to receive a constant signal having a level at $V_{cc}$, and its second input "D1" connected to receive the signal output from the output "Q" of the first data selector 310. One of the signals provided to first data input "D0" and second data input "D1" of the second data selector 320 is selected to be provided to the output "Q" of data selector 320 under the control of $UNAV\_ADD\_DEC_x$, provided to the select input "S" of data selector 310. The signal provided to the output "Q" of data selector 320 is the cell availability signal, $CAS_x$.

FIG. 4 illustrates a further embodiment 400 of a cell status circuit, $CSC_x$, of the cell determination logic circuit 130. Referring now to FIG. 4, a first two-input NAND device 410 is connected to receive $UNAV\_ADD\_DEC_x$ at its first input "D0" and is connected to receive the cell availability signal, $CAS_{((x-1)+N) REM N}$, generated by the "previous" cell availability status circuit, $CSC_{((x-1)+N) REM N}$. The first two-input NAND device 410 subjects the signal provided to the first data input "D0" and the second data input "D1" to a NAND logic function, and the result of the NAND logic function is provided to the output "Q" of the NAND device 410.

A second two-input NAND device 420 is connected to receive $AV\_ADD\_DEC_x$ at its first data input "D0" and is connected to receive the signal output from the "Q" output of the first two-input NAND device 410. The second two-input NAND device 420 subjects the signal provided to the inputs "D0" and "D1" to a NAND logic function, and the result of the NAND logic function is provided to the output "Q" of the second two-input NAND device 420 as the cell availability signal, $CAS_x$.

The FIG. 4 embodiment 400 has an advantage over the FIG. 3 embodiment 300 that there is less "ripple" delay through the two NAND devices 410, 420 of the FIG. 4 embodiment 400 than there is through the two data selectors 310, 320 of the FIG. 3 embodiment 300.

FIG. 5 illustrates a still further embodiment 500 of a cell status circuit, $CSC_x$, of the cell determination logic circuit 130. Referring now to FIG. 5, a four-to-one data selector 510 has its first and second data inputs, "D0" and "D1" connected to receive a constant signal having a level at $V_{cc}$. The four-to-one data selector 510 has its third data input, "D2" connected to receive a constant signal having a level at ground. Finally, the four-to-one data selector 510 has its fourth data input, "D3" connected to receive the cell availability signal, $CAS_{((x-1)+N) REM N}$, generated by the "previous" cell availability status circuit, $CSC_{((x-1)+N) REM N}$.

One of the signals provided to first through fourth data inputs, "D0" through "D3", respectively, of the four-to-one data selector 510 is selected to be provided to the output "Q" of data selector 510 under the control of UNAV__ADD__DEC$_x$, provided to the select input "S0" of data selector 510 and AV__ADD__DEC$_x$, provided to the select input "S1" of data selector 510.

The FIG. 5 embodiment 500 has an even further advantage over the FIG. 3 embodiment 300 than the FIG. 4 embodiment 400. In particular, there is even less "ripple" delay through the four-to-one data selector 510 of the FIG. 5 embodiment than there is through the two NAND devices 410, 420 of the FIG. 4 embodiment 400.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/45319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08451965, entitled "SERIAL INTERFACE CAPABLE OF OPERATING IN TWO DIFFERENT SERIAL DATA TRANSFER MODES" (atty. docket no. NSC 1-62800); U.S. patent application Ser. No. 08/43076, entitled "HIGH PERFORMANCE MULTI-FUNCTION DIRECT MEMORY ACCESS (DMA) CONTROLLER" (atty. docket no. NSC1-62900); U.S. patent application Ser. No. 08/452001, entitled "OPEN DRAIN MULTI-SOURCE CLOCK GENERATOR HAVING MINIMUM PULSE WIDTH" (atty. docket no. NSC1-63000); U.S. patent application Ser. No. 08/451503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451444, entitled "BARREL SHIFTER" (atty. docket no. NSC1-63400); U.S. patent application Ser. No. 08/451204, entitled "BIT SEARCHING THROUGH 8, 16, OR 32-BIT OPERANDS USING A 32-BIT DATA PATH" (atty. docket no. NSC1-63500); U.S. patent application Ser. No. 08/451195, entitled "DOUBLE PRECISION (64-BIT) SHIFT OPERATIONS USING A 32-BIT DATA PATH" (atty. docket no. NSC1-63600); U.S. patent application Ser. No. 08/451571, entitled "METHOD FOR PERFORMING SIGNED DIVISION" (atty. docket no. NSC1-63700); U.S. patent application Ser. No. 08/452112, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451434, entitled "AREA AND TIME EFFICIENT FIELD EXTRACTION CIRCUIT" (atty. docket no. NSC1-63900); U.S. patent application Ser. No. 08/451535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445563, entitled "TAGGED PREFETCH AND INSTRUCTION DECODER FOR VARIABLE LENGTH INSTRUCTION SET AND METHOD 0F OPERATION" (atty. docket no. NSC1-64100); U.S. patent application Ser. No. 08/450153, entitled "PARTITIONED DECODER CIRCUIT FOR LOW POWER OPERATION" (any. docket no. NSC1-64200); U.S. patent application Ser. No. 08/451495, entitled "CIRCUIT FOR DESIGNATING INSTRUCTION POINTERS FOR USE BY A PROCESSOR DECODER" (atty. docket no. NSC1-64300); U.S. patent application Ser. No. 08/451219, entitled "CIRCUIT FOR GENERATING A DEMAND-BASED GATED CLOCK" (atty. docket no. NSC1-64500); U.S. patent application Ser. No. 08/451214, entitled "INCREMENTOR/DECREMENTOR" (atty. docket no. NSC1-64700); U.S. patent application Ser. No. 08/451150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451198, entitled "CODE BREAKPOINT DECODER" (atty. docket no. NSC1-64900); U.S. patent application Ser. No. 08/445569, entitled "TWO TIER PREFETCH BUFFER STRUCTURE AND METHOD WITH BYPASS" (atty. docket no. NSC1-65000); U.S. patent application Ser. No. 08/445564, entitled "INSTRUCTION LIMIT CHECK FOR MICROPROCESSOR" (atty. docket no. NSC1-65100); U.S. patent application Ser. No. 08/452306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08451742, entitled "METHOD OF IMPLEMENTING FAST 486™ MICROPROCESSOR COMPATIBLE STRING OPERATION" (atty. docket no. NSC1-65900); U.S. patent application Ser. No. 08/452659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451507, entitled "DRAM CONTROLLER THAT REDUCES THE TIME REQUIRED TO PROCESS MEMORY REQUESTS" (atty. docket no. NSC1-66300); U.S. patent application Ser. No. 08/451207, entitled "INTEGRATED PRIMARY BUS AND SECONDARY BUS CONTROLLER WITH REDUCED PIN COUNT" (atty. docket no. NSC1-66400); U.S. patent application Ser. No. 08/452365, entitled "SUPPLY AND INTERFACE CONFIGURABLE INPUT/OUTPUT BUFFER" (atty. docket no. NSC1-66500); U.S. patent application Ser. No. 08/451744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451206, entitled "CONFIGURABLE POWER MANAGEMENT SCHEME" (atty. docket no. NSC1-66700); U.S. patent application Ser. No. 08/452350, entitled "BIDIRECTIONAL PARALLEL SIGNAL INTERFACE" (atty. docket no. NSC1-67000); U.S. patent application Ser. No. 08/452094, entitled "LIQUID CRYSTAL DISPLAY (LCD) PROTECTION CIRCUIT" (atty. docket no. NSC1-67100); U.S. patent application Ser. No. 08/45156, entitled "DISPLAY CONTROLLER CAPABLE 0F ACCESSING GRAPHICS DATA FROM A SHARED SYSTEM MEMORY" (atty. docket no. NSC1-67500); U.S. patent application Ser. No. 08/450726, entitled "INTEGRATED CIRCUIT WITH TEST SIGNAL BUSES AND TEST CONTROL CIRCUITS" (atty. docket no. NSC1-

67600); U.S. patent application Ser. no. 08/445568, entitled "DECODE BLOCK TEST METHOD AND APPARATUS" (atty. docket no. NSC1-68000).

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. An availability status indicator circuit for simultaneously indicating which of N circular buffer cells ($CBC_x$, for x=0 through N−1) are available for access, where the N circular buffer cells are sequentially accessible, with $CBC_x$ being accessed after $CBC_{((x-1)+N)\ REM\ N}$, the circuit comprising:

N cell status circuits ($CSC_x$, for x=0 through N−1) that correspond to the separate circular buffer cells ($CBC_x$, for x=0 through N−1, respectively), each cell status circuit, $CSC_x$, including:

a. an output terminal at which a cell availability status signal $CAS_x$ is provided to indicate the availability status of the corresponding circular buffer cell $CBC_x$;

b. a first input terminal connected to receive the cell availability status signal, $CAS_{((x-1)+N)\ REM\ N}$ from the output terminal of the previous cell status circuit, $CSC_{((x-1)+N)\ REM\ N}$;

c. a cell availability status signal generator that generates the cell availability status signal, $CAS_x$, in response to the cell availability status signal, $CAS_{((x-1)+N)\ REM\ N}$, to an available address indicator signal that includes an indicator of whether $CBC_x$ is a first circular buffer call available to be accessed, and to an unavailable address indicator signal that includes an indicator of whether $CBC_x$ is a last circular buffer cell available to be accessed, the cell availability status signal, $CAS_x$, having a first state if the corresponding circular buffer cell, $CBC_x$, is available for access and having a second state if the corresponding circular buffer cell, $CBC_x$ is not available for access.

2. The availability status indicator circuit of claim 1, wherein the cell availability status signal generator of each cell status circuit, $CSC_x$, provides one of the cell availability status signal, $CAS_{((x-1)+N)\ REM\ N}$, from the output terminal of the previous cell status circuit, $CSC_{((x-1)+N)\ REM\ N}$, as the cell availability status signal, $CAS_x$, if the available address indicator signal does not indicate that circular buffer cell, $CBC_x$, is the first circular buffer cell available for access and if the unavailable address indicator signal does not indicate that the circular buffer cell, $CBC_x$, is the last circular buffer cell available for access, a signal having the first state as the cell availability status signal, $CAS_x$, if the available address indicator signal indicates that circular buffer cell, $CBC_x$, is the first circular buffer cell available for access; and a signal having the second state as the cell availability status signal, $CAS_x$, if the unavailable address indicator signal indicates that the circular buffer cell, $CBC_x$, is the last circular buffer cell available for access.

3. The availability status indicator circuit of claim 2, wherein the cell availability status signal generator of at least one of each cell status circuit, $CSC_x$, includes a first data selector having a select input, first and second data inputs, and a data output, and that provides to the data output, in response to the available address indicator, received at the select input, one of a constant signal having the first state, received at the first data input, and $CAS_{((x-1)+N)\ REM\ N}$, received at the second data input; and a second data selector having a select input, first and second data inputs, and a data output, and that provides to the data output, in response to the unavailable address indicator, received at the select input, one of a constant signal having the second state, received at the first data input, and the signal provided to the data output of the first data selector, received at the second data input, wherein the signal provided at the data output of the second data selector is the cell availability status signal, $CAS_x$.

4. The availability status indicator circuit of claim 2, wherein the cell availability status signal generating means of at least one of the cell status circuits, $CSC_x$, includes a first NAND device having first and second inputs and an output, the first input being connected to receive the unavailable address indicator and the second input being connected to receive $CAS_{((x-1)+N)\ REM\ N}$; and a second NAND device having first and second inputs and an output, the first input being connected to receive a signal output from the first NAND device and the second input being connected to receive the available address indicator, wherein the signal provided at the output of the second NAND device is the cell availability status signal, $CAS_x$.

5. The availability status indicator circuit of claim 2, wherein the cell availability status signal generating means of at least one of the cell status circuits, $CSC_x$, includes a data selector having at least four data inputs and two select inputs, wherein the first and second data inputs are connected to receive a constant signal having the first state, the third data input is connected to receive a constant input having the second state, and the fourth data input is connected to receive $CAS_{((x-1)+N)\ REM\ N}$, and wherein the first select input is connected to receive the available address indicator signal and wherein the second select input is connected to receive the unavailable address indicator signal.

* * * * *

UNITED STATES PATENT AND TRADEMARK OFFICE
CERTIFICATE OF CORRECTION

PATENT NO. : 5,617,543
DATED : April 1, 1997
INVENTOR(S) : Christopher E. Phillips It is certified that error appears in the above-indentified patent and that said Letters Patent is hereby corrected as shown below:

In Col. 7, line 33, delete "call" and replace with --cell--.

Signed and Sealed this

Third Day of June, 1997

Attest:

BRUCE LEHMAN

*Attesting Officer*      *Commissioner of Patents and Trademarks*